United States Patent [19]

Sujita et al.

[11] Patent Number: 5,482,787
[45] Date of Patent: Jan. 9, 1996

[54] ORGANIC COMPOSITE COATED STEEL STRIP HAVING IMPROVED CORROSION RESISTANCE AND SPOT WELDABILITY

[75] Inventors: Shigeko Sujita; Nobuyuki Morito, both of Chiba, Japan

[73] Assignee: Kawasaki Steel Corporation, Japan

[21] Appl. No.: 135,311

[22] Filed: Oct. 12, 1993

Related U.S. Application Data

[63] Continuation of Ser. No. 865,916, Apr. 9, 1992, abandoned.

[30] Foreign Application Priority Data

Apr. 12, 1991 [JP] Japan .................... 3-108359

[51] Int. Cl.⁶ ................................... B32B 15/08
[52] U.S. Cl. ................. 428/623; 428/626; 428/659; 428/632
[58] Field of Search ................... 428/622, 623, 428/626, 659, 632, 633

[56] References Cited

U.S. PATENT DOCUMENTS

| | | | |
|---|---|---|---|
| 4,411,964 | 10/1983 | Hara et al. | 428/626 |
| 4,775,600 | 10/1988 | Adaniya et al. | 428/659 |
| 4,970,126 | 11/1990 | Adaniya et al. | 428/623 |
| 4,985,311 | 1/1991 | Shindou et al. | 428/623 |
| 5,102,746 | 4/1992 | Shindou et al. | 428/623 |
| 5,294,485 | 3/1994 | Takao et al. | 428/626 |

FOREIGN PATENT DOCUMENTS

| | | |
|---|---|---|
| 282073 | 9/1988 | European Pat. Off. . |
| 298409 | 1/1989 | European Pat. Off. . |
| 312599 | 4/1989 | European Pat. Off. . |
| 0390122 | 10/1990 | European Pat. Off. . |
| 423740 | 4/1991 | European Pat. Off. . |
| 62-283161 | 12/1987 | Japan . |
| 63-35798 | 2/1988 | Japan . |
| 3-32638 | 5/1991 | Japan . |
| 3-268939 | 11/1991 | Japan . |
| 3-269067 | 11/1991 | Japan . |

OTHER PUBLICATIONS

Patent Abstracts of Japan, M Field, vol. 13, No. 177, Apr. 26, 1989, p. 86 M 818 Kokai–No. 1– 034 (NKK Corporation).
Patent Abstracts of Japan, M. Field, vol. 14, No. 373, Aug. 13, 1990, p. 37 M 1009 Kokai–No. 2–134 238 (Kawasaki).

*Primary Examiner*—Michael Lewis
*Assistant Examiner*—N. M. Nguyen
*Attorney, Agent, or Firm*—Austin R. Miller

[57] ABSTRACT

An organic composite coated steel strip having well-balanced corrosion resistance, coating properties including adaptability to electrophoretic coating and water resistant secondary coating adherence, and spot weldability is provided. The organic composite coated strip comprises a zinc or zinc base alloy plated steel substrate; a chromate later on the substrate containing up to 70% by weight of $Cr^{6+}$ based on the total chromium quantity, the chromate layer being coated in a weight of 5 to 500 mg/m² in terms of elemental chromium; and an organic composite layer on the chromate layer mainly comprising silica and an organic high molecular weight resin. In the organic composite coated steel strip, (a) silica has an average primary particle diameter of 5 to 30 nm; (b) silica is agglomerated into agglomerates of an average thickness of 0.2 to 2 μm and an average apparent diameter of 5 to 300 μm; and (c) the organic composite layer has been coated to a dry weight of 0.1 to 3 g/m². The organic composite coated steel strip of the invention has various uses including automobile bodies.

5 Claims, 2 Drawing Sheets

ORGANIC COMPOSITE COATED STEEL STRIP HAVING IMPROVED CORROSION RESISTANCE AND SPOT WELDABILITY

This application is a continuation of application Ser. No. 07/865,916, filed Apr. 9, 1992, now abandoned.

This invention relates to an organic composite coated steel strip having improved cation electrodeposition coating ability, spot weldability and corrosion resistance mainly used for automobile body after press forming.

BACKGROUND OF THE INVENTION

In recent years, to meet severer corrosion resistance requirements for automobile bodies, surface treated steel strips in the form of conventional cold rolled steel strips plated with zinc or zinc base alloy are often used.

Such surface treated strips include galvanized steel strips, galvannealed steel strips, zinc electroplated steel strips and zinc base alloy electroplated steel strips. A high bare corrosion resistance is needed in internal strip configurations including internal cavity-defining structures and bends (hems) where protective coatings after pressing and body assembly cannot fully cover.

Organic composite coated steel strips having chromate and organic high molecular weight resin coatings on a zinc or zinc base alloy plated steel substrate were developed for automobile use as disclosed in Japanese Patent Application Kokai Nos. 57(1982)-108292 and 58(1983)-224174. These proposals intend to provide high corrosion resistance by coating a chromate treated, zinc or zinc base alloy plated steel substrate with a coating composition containing an organic resin and a water dispersed silica sol. However, the use of water dispersed silica sol gives rise to several problems including (1) poor resistance to chromium dissolution due to the presence of residual water-soluble components in the coating which allow water to penetrate into the coating during subsequent chemical conversion treatment so that the chromium in the underlying chromate layer can dissolve out to contaminate the environment, (2) separation of the coating during alkali degreasing which can lead to a loss of corrosion resistance, and (3) poor adherence between the resin layer and the chromate layer caused by penetration of water underneath the coating upon exposure to a corrosive environment resulting in dissolution of the water soluble components therein to exhibit high alkalinity cleaving the interfacial bond between the resin and the chromate.

One solution for the above problems is disclosed in Japanese Patent Application Kokai No. 63(1988)-22637 which uses a coating composition comprising an epoxy resin and a hydrophobic silica obtained by subjecting silica on its surface to organic substitution in an organic solvent. Although compatibility is maintained between silica sol and the organic resin and improved adherence after coating is achieved, it has been pointed out that this coating suffers from an insufficient corrosion resistance.

Furthermore, the use of normal silica sol of either a water or an organic solvent system resulted in a problem of a significantly inferior spot weldability compared to zinc base alloy plated steel strip having no organic coating.

SUMMARY OF THE INVENTION

The present invention is made to eliminate the above-mentioned problems of the prior art and its object is to provide an organic composite coated steel strip having improved corrosion resistance in combination with excellent spot weldability without compromising either of the properties as has been done in the prior art.

The inventors of the present invention undertook an intensive study on the corrosion resistance and the spot weldability of the organic composite coated steel strip, which properties had been difficult to impart with the organic composite coated steel strip without compromising either of the properties. It has been known that in an organic composite coated steel strip comprising a zinc or a zinc based alloy plated steel strip, a chromate layer, and an organic composite layer comprising silica and an organic resin, the components playing important roles in providing the corrosion resistance are the chromate and the silica in the organic composite layer although these components adversely affect the spot weldability. The inventors, however, have found after an intensive study on the corrosion resistance and the spot weldability of the organic composite coated steel strip that both of the above-mentioned two properties may be imparted with the organic composite coated steel strip without compromising either of the properties by controlling distribution of the silica in the organic composite layer. The present invention has been achieved on the bases of such a finding.

According to the present invention, there is provided a novel organic composite coated steel strip having improved corrosion resistance and spot weldability, comprising a zinc or zinc base alloy plated steel substrate, a chromate layer on the substrate containing up to 70% by weight of $Cr^{6+}$ based on the total chromium quantity, said chromate layer being coated in a weight of 5 to 500 mg/m$^2$ in terms of elemental chromium, and an organic composite layer on said chromate layer mainly comprising silica and an organic high molecular weight resin, wherein (a) said silica has an average primary particle size of 5 to 30 nm, (b) said silica is agglomerated in said organic composite layer into agglomerates of an average thickness of 0.2 to 2 µm and an average apparent diameter of 5 to 300 µm, and (c) said organic composite layer has been coated to a dry weight of 0.1 to 3 g/m$^2$.

Preferably, the organic composite layer of the organic composite coated steel strip is formed by applying a coating composition having blended therein an organic solvent-dispersed silica sol having an average agglomerate diameter of 0.05 to 2 µm.

According to another embodiment of the present invention, the organic composite layer of the organic composite coated steel strip is preferably formed by applying a coating composition having blended therein hydrophobic fumed silica.

Preferably, the organic high molecular weight resin of the organic composite layer in the organic composite coated steel strip primarily comprises an epichlorohydrin-bisphenol A epoxy resin having a number average molecular weight of at least 2,000.

The silica and the organic resin in the organic composite layer of the organic composite coated steel strip is preferably in such a dry weight ratio that 10 to 100 parts by weight of the silica is present per 100 parts by weight of the resin.

DETAILED DESCRIPTION OF THE INVENTION

Figure 1:
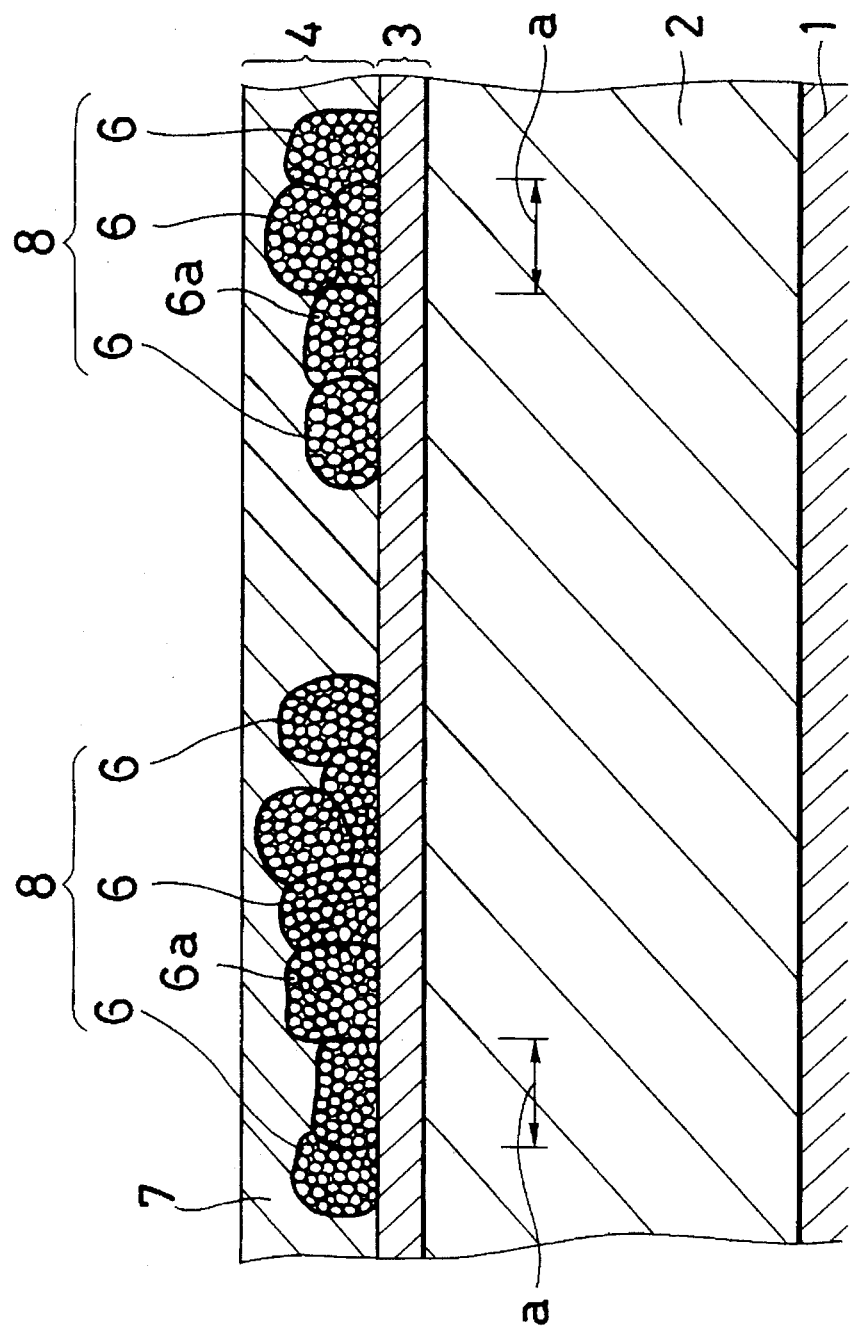
FIG. 1 is a schematic cross-sectional view of the organic composite coated steel strip of the present invention.

The present invention is hereinafter described in further detail.

The starting stock material is a zinc plated steel or a zinc base alloy plated strip steel, which are sometimes referred to as a zinc plated strip steel for brevity. The types of plating applied to steel substrates include all conventional zinc platings used for anti-corrosion purpose, for example, pure Zn plating, binary alloy platings such as Zn—Ni alloy platings, Zn—Fe alloy platings and Zn—Cr alloy platings, and ternary alloy platings such as Zn—Ni—Cr alloy platings and Zn—Co—Cr alloy platings. In addition, composite dispersion platings as typified by Zn—$SiO_2$ platings and Zn—Co—Cr—$Al_2O_3$ platings are acceptable. These zinc platings may be applied by electroplating, hot dipping, or vapor plating.

The zinc plated steel substrate is subjected to chromate treatment primarily for enhancing adherence or receptivity to an overlying organic composite layer which will be described later in further detail, and secondarily for imparting high corrosion resistance. The chromate layer is coated to a coating weight of 5 to 500 mg/$m^2$, preferably 10 to 150 mg/$m^2$ calculated as elemental chromium. A chromium coating weight of less than 5 mg/$m^2$ is undesirable for corrosion resistance and coating adherence. In excess of 500 mg/$m^2$, no further improvement in corrosion resistance is expectable and insulating film resistance is increased to such an extent as to deter spot welding and electrophoretic deposition.

The chromate treatment may be conducted by any conventional techniques including coating chromate techniques using a roll coater or the like, electrolytic chromate techniques, and reactive chromate techniques. The proportion of $Cr^{6+}$ in the chromate should be up to 70% by weight based on the total chromium quantity. If the proportion of $Cr^{6+}$ exceeds 70% by weight, the chromate layer allows chromium to dissolve out during alkali degreasing.

On the chromate layer is applied an organic composite layer comprising silica and an organic high molecular weight resin. The type of the organic resin incorporated in a coating composition applied herein to form the organic composite layer is not particularly limited. Exemplary organic resins include epoxy resins, acrylic resins, polyethylene resins, alkyd resins and urethane resins. Particularly preferred are resin compositions primarily comprising epichlorohydrin-bisphenol A epoxy resins having a number average molecular weight of 2,000 or more as disclosed in European Patent Application Laid-Open No. 385362 or 390122 in view of toughness and corrosion resistance of the product. Use of a resin having a number average molecular weight of less than 2,000 may result in significantly inferior corrosion resistance and coating adhesion.

As mentioned above, the chromate layer and the overlying organic composite layer are responsible for the high corrosion resistance of the organic composite coated steel strip of the present invention. In addition, it is quite important that an appropriate number of silanol groups are present on the surface of silica particles in the organic composite layer. For example, when hydrophobic silica sol uniformly dispersed in an organic solvent is incorporated in the coating composition, it may maintain a sufficient compatibility with the organic resin to provide an excellent adherence after coating, but the ability to stably hold zinc corrosion products formed under the coating upon exposure to a corrosive environment has been lost because the silanol groups on the silica particles have been consumed in the interaction with the surrounding organic high molecular weight molecules. As a result, corrosion resistance becomes substantially poor. In order to retain an appropriate number of silanol groups on the silica particle in the organic composite layer, it is desired that the primary particles of silica in the organic composite layer is quite minute, and that many silica primary particles are agglomerated to form silica agglomerates to retain surface silanol groups which are not in direct contact with the surrounding organic high molecular weight molecules.

More illustratively, the silica may have an average primary particle diameter of 5 to 30 nm, and the silica primary particles may be agglomerated in the organic composite layer to form agglomerates of an average thickness of 0.2 to 2 μm and an average apparent diameter of 5 to 300 μm. An average silica primary particle diameter of less than 5 nm results in an excessive agglomeration of the silica particles in the coating composition, leading to an extreme difficulty to keep the agglomerates to a size suitable for preparation of the coating composition and application of the thus prepared coating composition onto the steel strip. An average silica primary particle diameter of more than 30 nm is likely to result in an insufficient number of the surface silanol groups necessary for holding the zinc corrosion products. The particle size of such a fine silica may also be expressed in terms of specific surface area, and the average primary particle diameter of 5 to 30 nm corresponds to a specific surface area of about 80 to 500 $m^2$/g.

As mentioned above, in the organic composite coated steel strip of the present invention, silica has been agglomerated in the organic composite layer to form agglomerates of an average thickness in the range of 0.2 to 2 μm and an average apparent diameter in the range of 5 to 300 μm. Such an agglomeration of the silica into the agglomerates of the size within the above-specified ranges may result in various merits including:

i) ability to stably hold the zinc corrosion products formed in the coating upon exposure to a corrosive environment;

ii) substantially uniform distribution of the silica agglomerates; and iii) no unduly increased electric resistance between welding electrode and the steel strip during spot welding to induce undesirable welding sparks and electrode wear.

The merits as summarized above result in the high corrosion resistance and fair spot weldability of the organic composite coated steel strip of the present invention.

It is to be noted that the term "average thickness" of the silica agglomerates used herein means average thickness or height of the agglomerates measured in normal direction to the major surface of the steel substrate.

The term "average apparent diameter" of the silica agglomerates used herein means, in the case of a single, separate secondary agglomerate, average of the longer diameter and the shorter diameter measured in horizontal directions to the major surface of the steel substrate, and in the case of agglomerates serially joined in a belt-like configuration, average of the width measured in a horizontal direction to the major surface of the steel substrate.

The silica agglomerates may have any desired configuration so long as the agglomerates are of the size within the above-specified ranges. Exemplary configurations of the silica agglomerates observed in normal direction to the steel substrate include circles, ellipsoids, concave and convex polygons, and any of such configurations joined to form a straight or branched belt-like configuration.

The silica agglomerates are substantially uniformly distributed throughout the organic composite layer of the invention at a substantially consistent density.

The coating composition comprising the organic resin blended with the silica is applied on the chromate treated zinc or zinc alloy plated steel substrate to form an organic composite layer thereon by any desired commercial method including roll coating and air knife coating methods. The organic composite layer has a dry weight of 0.1 to 3 g/m$^2$. Less than 0.1 g/m$^2$ is too thin to improve corrosion resistance whereas more than 3.0 g/m$^2$ results in an increased film resistance which will adversely affect spot welding and electrophoretic deposition. A dry weight of at least 0.3 g/m$^2$ is desirable in view of an improved corrosion resistance when no overlying layer is applied before use under corrosive conditions. When an overlying layer is applied on the organic composite layer by electrophoretic deposition, for example, it has been confirmed that an application of the organic composite layer to a dry weight of 0.1 g/m$^2$ is sufficient to provide a satisfactory corrosion resistance with the coated steel strip.

The source of silica used herein is not limited to any particular type so long as the size of the primary silica particle and the distribution of silica in the organic composite layer meet the above-specified conditions. Preferable examples include an organic solvent-dispersed silica sol prepared by controlling surface charge state of a water-dispersed silica sol by adjusting the amount of an alkaline metal ion or a multivalent metal ion to facilitate primary agglomeration of the primary silica particles into primary agglomerates, and then dispersing the thus formed primary agglomerates in an organic solvent, for example, butanol, xylene, ethyl cellosolve, butyl cellosolve, or propyl cellosolve to substitute the dispersion medium. In the case of the organic solvent-dispersed silica sol, the primary agglomerates are required to have an average agglomerate diameter in the range of 0.05 to 2 µm.

Another preferable source of the silica is hydrophobic fumed silica in consideration of silanol groups on the surface of silica particles substituted with organic groups which facilitate not only compatibility with the organic resin and excellent adherence of the coating but also an adequate secondary agglomeration of the primary silica agglomerates.

The organic composite layer preferably contains the organic resin and the silica in such amounts that 10 to 100 party by weight of the silica is present per 100 parts by weight of the resin on a dry basis. Corrosion resistance will be less desirable with less than 10 parts by weight of silica since such an amount of silica in the organic composite layer is insufficient for stably holding zinc base corrosion products formed in the coating under a corrosive environment. On the other hand, with more than 100 parts by weight of silica, excess silica will not remain compatible with the resin binder so that the resulting coating composition becomes difficult to apply to the steel strip.

FIG. 1 a cross-sectional view of the organic composite coated steel strip of the present invention to schematically illustrate distribution of the silica. In FIG. 1, on the steel strip 1 is overlaid the zinc or zinc base alloy plated layer 2, the chromate layer 3, and the organic composite layer 4. The silica primary particles 6a have undergone primary agglomeration in the organic solvent to form the silica primary agglomerates 6. The silica primary agglomerates 6 undergo secondary agglomeration during drying after application of the coating composition on the chromate layer 3 to form silica secondary agglomerates 8 in the dried organic binder resin 7 constituting the organic composite layer 4.

As set forth above, the silica primary particles 6a have an average diameter of 5 to 30 nm, and the silica primary particles 6a have undergone primary agglomeration to form the silica primary agglomerates 6 having an average diameter a as indicated in FIG. 1 of 0.05 to 2 µm. After application of the coating composition to form the organic composite layer 4, the silica primary agglomerates 6 undergo secondary agglomeration during the drying stage in the organic binder resin 7 to form the silica secondary agglomerates 8.

Figure 2:
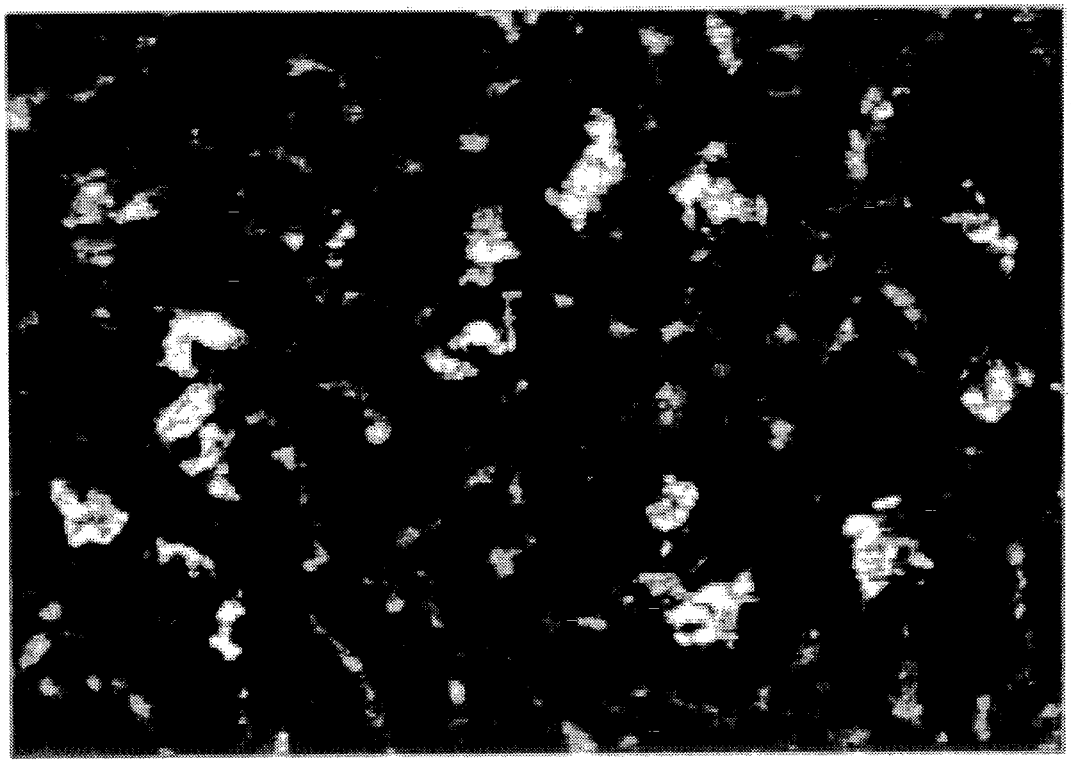
FIG. 2 is a photograph showing distribution of silica secondary agglomerates over the steel substrate.

FIG. 2 is a photograph at a magnification of 50 showing a typical organic composite layer of the organic composite coated steel strip of the present invention wherein the silica secondary agglomerates are substantially uniformly distributed throughout the organic composite layer. Preferably, the silica secondary agglomerates are distributed all over the steel substrate at a substantially consistent density although the density need not be strictly consistent, since the silica secondary agglomerates, which effectively provide sites for stably holding the zinc base corrosion products formed under the organic composite coating under corrosive conditions, are important to realize a high corrosion resistance. When the silica secondary agglomerates are not substantially uniformly distributed over the steel substrate, the area in the organic composite layer primarily comprising the organic binder resin with insufficient silica would be increased to significantly detract from corrosion resistance, whereas spot weldability would be deterred in the area where silica agglomerates are unduly dense.

Next, production of the organic composite coated steel strip in accordance with the present invention is set forth.

The characteristic feature of the present invention resides in the secondary agglomeration of the silica primary agglomerates into the silica secondary agglomerates which are substantially uniformly distributed in the organic resin of the organic composite layer. Therefore, in the following description, production of the organic composite coated layer is described by referring to a process wherein the coating composition having dispersed therein the silica primary agglomerates 6 comprising the silica primary particle 6a is applied onto the chromate treated zinc or zinc base alloy plated steel strip, and then dried to facilitate the secondary agglomeration of the silica primary agglomerates 6 into the substantially uniformly distributed silica secondary agglomerates 8 in the organic composite layer 4 as schematically illustrated in FIG. 1.

The merit of facilitating the secondary agglomeration of the silica primary agglomerates into the silica secondary agglomerates in the organic composite layer after the application of the coating composition on the chromate layer, and not before the application of the coating composition, is growth of the secondary agglomerates in horizontal directions to the major surface of the steel substrate to thereby enable control of the silica secondary agglomerate growth direction to provide the silica secondary agglomerates of the desired configuration and the size. The secondary agglomeration takes place before completion of the drying of the coating composition, and therefore, it is important that the secondary agglomeration is completed before the completion of the drying. Accordingly, it is desirable that the coating composition applied is moderately dried at a temperature elevation rate of up to 20° C./second. Although a low temperature elevation rate is not necessarily inconvenient in view of the silica agglomeration, the drying stage in a drying furnace will be unduly long and flaws are likely to be generated on the coated steel strip due to catenary or sagging when the temperature elevation is too slow. Therefore, the temperature elevation rate is desirably not less than 1° C./second. To prevent the silica secondary agglomerates from growing to an average thickness of over 2 µm, the coating composition may be applied on the chromate layer evenly so that the coating thickness before drying would be consistent all over the steel strip.

When the organic composite coating dries with the coating thickness being maintained at a constant level, the secondary agglomeration of the silica would take place within the coating since the dry weight ratio of the silica to the organic binder resin is such that 10 to 100 parts by weight of silica is present per 100 parts by weight of the resin.

The organic composite coated steel strip in accordance with the present invention may have either one major surface or both of the major surfaces treated as described above. When only one major surface is treated as set forth above, the other major surface may be left as it is or may be subjected to at least one of the following treatments:

i) zinc plating; zinc alloy platings such as Zn—Ni, Zn—Fe, and Zn—Cr alloy platings; and Zn composite dispersion platings;

ii) chromate treatment; and iii) conventional organic composite coating treatments.

Examples of the present invention are given below together with a Comparative Example by way of illustration and not by way of limitation.

EXAMPLES

Example 1

A low carbon cold rolled steel strip of 0.8 mm thick was plated with a Zn—Ni alloy containing 12% by weight of Ni to a coating weight of 20 g/m$^2$, chromate treated with a coating chromate containing 50% of $Cr^{6+}$ based on the total chromium weight to a weight of 50 mg/m$^2$ of Cr using a roll coater, baked at a maximum strip temperature of 130° C., coated with a coating composition containing 9% by weight of epoxy resin having a number average molecular weight of 3750 (Epikote 1009 manufactured by Shell Chemical K.K.) and 6% by weight of silica sol having an average primary particle diameter of 10 nm and an average agglomerate diameter of 0.4 µm dispersed in ethyl cellosolve to a dry weight of 1 g/m$^2$ using a roll coater, heated at a temperature elevation rate of 4° C./sec., baked at a maximum strip temperature of 160° C., cooled with water immediately after the baking, and dried. It was confirmed that the resulting organic composite coated steel strip had an organic composite layer wherein silica had been agglomerated to form silica agglomerates of an average thickness of 0.6 µm and an average apparent diameter of 30 µm, and the silica agglomerates were substantially uniformly distributed over the steel strip. The organic composite coated steel strip was evaluated for its performance by various tests as described below.

Corrosion resistance

A combined cycle corrosion test was carried out, each cycle consisting of (1) salt water spraying for 4 hours with 5% NaCl aqueous solution at 35° C., (2) drying for 2 hours at 60° C., and (3) wetting for 2 hours at 50° C. No red rust was generated after repeating more than 200 cycles.

Resistance for chromium dissolution

A coated steel strip specimen was treated in four steps of degreasing, water washing, surface conditioning, and chemical conversion. The amount of chromium on the specimen before and after the treatment was measured by a fluorescent X-ray analyzer to find an amount of chromium dissolved out of 1 mg/m$^2$ or less.

Adaptability to electrophoretic coating

An electrocoat was applied to a coated specimen by conducting electrodeposition at a voltage of 100 volts for 180 seconds in Power Top U-600 (manufactured by Nihon Paint K.K.) at 28° C., and baking at 170° C. for 20 minutes. The appearance was evaluated in terms of the number of gas pinholes to find approximately 0 pinhole/cm$^2$. The electrodeposited specimen did not exhibit pebbly appearance.

Water resistant secondary adherence of coating

A coated specimen was subjected to electrophoretic deposition to 20 µm, and overcoated with Lugabake White (manufactured by Kansai Paint K.K.) to 35 µm. After immersing in pure water at a temperature of 40° C. for 10 days, the specimen was scribed with a cutter to define a pattern of 10×10 sections each 2 mm square. The percent of remaining coating sections after adhesive tape peeling was determined to evaluate the water resistant secondary adherence of the coating. The percent of remaining coating sections was 100%, and no peeling of the coating was observed.

Spot weldability

Using a welding electrode tip of an $Al_2O_3$ dispersed copper alloy having a tip diameter of 6 mm, continuous welding was carried out with a welding current of 9 kA and a resistance welding time of 10 cycles at a welding force of 200 kgf. The number of spot welds that could be made without interruption was counted until nugget diameter has been reduced below a reference value. The number of the spot welds was 3,500.

Example 2

A low carbon cold rolled steel strip of 0.8 mm thick was plated with a Zn—Ni alloy containing 12% by weight of Ni to a coating weight of 20 g/m$^2$, chromate treated as in Example 1, coated with a coating composition containing 9% by weight of urethane modified epoxy resin (modification rate, 30%) having a number average molecular weight of 8,000 and 6% by weight of silica sol having an average primary particle diameter of 7 nm and an average agglomerate diameter of 0.4 µm dispersed in ethyl cellosolve to a dry weight of 0.7 g/m$^2$ using a roll coater, heated at a temperature elevation rate of 6° C./sec., baked at a maximum strip temperature of 160° C., cooled with water immediately after the baking, and dried. It was confirmed that the resulting organic composite coated steel strip had an organic composite layer wherein silica had been agglomerated to form plate-form silica agglomerates of an average thickness of 0.5 µm and an average apparent diameter of 10 µm, and the silica agglomerates were substantially uniformly distributed over the steel strip. The organic composite coated steel strip was evaluated for its performance by various tests as described in Example 1.

Corrosion resistance

No red rust was generated after repeating more than 200 cycles.

Resistance for chromium dissolution

The amount of chromium dissolved out was 1 mg/m$^2$ or less.

Adaptability to electrophoretic coating

The electrodeposited specimen had approximately 0 pinhole/cm² and no pebbly appearance.

Water resistant secondary adherence of coating

The percent of remaining coating sections after peeling the tape was 100%, and no peeling of the coating was observed.

Spot weldability

The number of spot welds that could be made without interruption until nugget diameter has been reduced below the reference value was 4,000.

Example 3

A low carbon cold rolled steel strip of 0.8 mm thick was plated with a Zn—Ni alloy containing 12% by weight of Ni to a coating weight of 20 g/m², chromate treated as in Example 1, coated with a coating composition containing 9% by weight of urethane modified epoxy resin (modification rate, 30%) having a number average molecular weight of 8,000 and 6% by weight of hydrophobic fumed silica having a specific surface area of 150 m²/g to a dry weight of 1.5 g/m² using a roll coater, heated at a temperature elevation rate of 2° C./sec., baked at a maximum strip temperature of 160° C., cooled with water immediately after the baking, and dried. It was confirmed that the resulting organic composite coated steel strip had an organic composite layer wherein silica had been agglomerated to form silica agglomerates of an average thickness of 1.0 μm and an average apparent diameter of 50 μm, and the silica agglomerates were substantially uniformly distributed over the steel strip. The organic composite coated steel strip was evaluated for its performance by various tests as described in Example 1.

Corrosion resistance

No red rust was generated after repeating more than 200 cycles.

Resistance for chromium dissolution

The amount of chromium dissolved out was 1 mg/m² or less.

Adaptability to electrophoretic coating

The electrodeposited specimen had approximately 0 pinhole/cm² and no pebbly appearance.

Water resistant secondary adherence of coating

The percent of remaining coating sections after peeling the tape was 100%, and no peeling of the coating was observed.

Spot weldability

The number of spot welds that could be made without interruption until nugget diameter has been reduced below the reference value was 3,000.

Comparative Example

A low carbon cold rolled steel strip of 0.8 mm thick was plated with a Zn—Ni alloy containing 12% by weight of Ni to a coating weight of 20 g/m², chromate treated with a coating chromate containing 50% of $Cr^{6+}$ based on the total chromium weight to a weight of 50 mg/m² of Cr using a roll coater, baked at a maximum strip temperature of 130° C., coated with a coating composition containing 9% by weight of epoxy resin having a number average molecular weight of 3750 (Epikote 1009 manufactured by Shell Chemical K.K.) and 6% by weight of silica sol having an average primary particle diameter of 10 nm dispersed in ethyl cellosolve to a dry weight of 2.0 g/m² using a roll coater, heated at a temperature elevation rate of 4° C./sec., baked at a maximum strip temperature of 160° C., cooled with water immediately after the baking, and dried. It was confirmed that the resulting organic composite coated steel strip had an organic composite layer wherein silica particles of an average diameter of 10 nm were substantially uniformly distributed over the steel substrate. The organic composite coated steel strip was evaluated for its performance by various tests as described in Example 1.

Corrosion resistance

No red rust was generated after repeating more than 200 cycles.

Resistance for chromium dissolution

The amount of chromium dissolved out was 1 mg/m² or less.

Adaptability to electrophoretic coating

The electrodeposited specimen had approximately 10 pinholes/cm² and pebbly appearance in some parts.

Water resistant secondary adherence of coating

The percent of remaining coating sections after peeling the tape was 100%, and no peeling of the coating was observed.

Spot weldability

The number of spot welds that could be made without interruption until nugget diameter has been reduced below the reference value was 300.

As set forth above, the organic composite coated steel strip of the present invention has a high corrosion resistance and good coating properties such as adaptability to electrophoretic coating and water resistant secondary coating adherence in combination with an excellent spot weldability. Therefore, commercial value of the organic composite coated steel strip of the present invention is quite high, and it may be used for automobile bodies and many other applications where the steel strip is desired to have similar properties.

We claim:

1. An organic composite coated steel strip having improved corrosion resistance and spot weldability, comprising a zinc or zinc base alloy plated steel substrate, a chromate layer on the substrate containing up to 70% by weight of $Cr^{6+}$ based on the total chromium quantity, said chromate layer being coated in a weight of 5 to 500 mg/m² in terms of elemental chromium, and an organic composite layer on said chromate layer mainly comprising silica and an organic high molecular weight resin, wherein (a) said silica has an average primary particle size of 5 to 30 nm, (b) said silica is agglomerated in said organic composite layer into plate shaped secondary agglomerates having an outer surface, an average thickness of 0.2 to 2 μm and an average diameter of 5 to 300 μm, said silica containing silanol groups which are not in direct contact with surrounding organic high molecular weight molecules of said resin to hold zinc corrosion products upon exposure to a corrosive environment, and (c) said organic composite layer being coated to a dry weight of 0.1 to 3 g/m².

2. The organic composite coated steel strip having improved corrosion resistance and spot weldability according to claim 1 wherein said organic composite layer is formed by applying a coating composition having blended therein an organic solvent-dispersed silica sol containing primary agglomerates formed from said silica wherein said primary agglomerates have an average primary agglomerate diameter of 0.05 to 2 μm.

3. The organic composite coated steel strip having improved corrosion resistance and spot weldability according to claim 1 wherein said silica is hydrophobic fumed silica having said silanol groups and alkyl groups on the outer surface of said silica in place of silanol groups, wherein said organic composite layer is formed by applying a coating composition having blended therein said hydrophobic fumed silica.

4. The organic composite coated steel strip having improved corrosion resistance and spot weldability according to claim 1 wherein said organic high molecular weight resin primarily comprises an epichlorohydrin-bisphenol A epoxy resin having a number average molecular weight of at least 2,000.

5. The organic composite coated steel strip having improved corrosion resistance and spot weldability according to claim 1 wherein said organic composite layer contains the silica and the organic resin in such a dry weight ratio that 10 to 100 parts by weight of the silica is present per 100 parts by weight of the resin.

* * * * *